(12) United States Patent
Groves

(10) Patent No.: US 8,376,291 B1
(45) Date of Patent: Feb. 19, 2013

(54) FOLDABLE A-FRAME CARRIER

(76) Inventor: Henry R. Groves, Bokeelia, FL (US)

( * ) Notice: Subject to any disclaimer, the term of this patent is extended or adjusted under 35 U.S.C. 154(b) by 443 days.

(21) Appl. No.: 12/655,873

(22) Filed: Jan. 8, 2010

(51) Int. Cl.
*F16M 11/38* (2006.01)

(52) U.S. Cl. ............ 248/166; 182/153; 182/180.1; 211/41.14; 248/165; 248/188.8

(58) Field of Classification Search .......... 248/166, 248/165, 168, 169, 188.8; 211/41.14, 41.15, 211/41.1, 198, 189, 195; 182/153, 180.1
See application file for complete search history.

(56) References Cited

U.S. PATENT DOCUMENTS

| | | | |
|---|---|---|---|
| 295,269 A * | 3/1884 | Miller | 182/153 |
| 391,191 A * | 10/1888 | Ritterhouse | 211/198 |
| 615,364 A * | 12/1898 | Porten | 182/153 |
| 1,301,145 A * | 4/1919 | Mclaughlin | 211/29 |
| 2,272,957 A * | 2/1942 | Walp | 182/224 |
| 2,966,957 A * | 1/1961 | Ireland | 182/224 |
| 3,596,755 A * | 8/1971 | Bundy et al. | 206/452 |
| 3,878,942 A * | 4/1975 | Hansen et al. | 206/454 |
| 3,955,676 A * | 5/1976 | Hansen et al. | 206/451 |
| 4,030,565 A * | 6/1977 | Chaput | 182/151 |
| 4,304,336 A * | 12/1981 | Mays | 211/41.14 |
| 4,626,017 A * | 12/1986 | Robertson | 296/3 |
| 4,792,258 A | 12/1988 | Goff | |
| 4,836,332 A | 6/1989 | Henson | |
| 5,085,329 A | 2/1992 | Crowell et al. | |
| 5,711,098 A | 1/1998 | Warne | |
| 5,915,570 A | 6/1999 | Orsini | |
| 5,954,156 A | 9/1999 | Cooke | |
| 6,095,534 A | 8/2000 | Wong | |
| 6,209,683 B1 * | 4/2001 | Holtz | 182/225 |
| 6,386,376 B1 | 5/2002 | Mendoza-Castillo et al. | |
| 6,536,607 B1 * | 3/2003 | Knoll et al. | 211/41.14 |
| 6,598,840 B1 | 7/2003 | Siegl | |
| 6,820,752 B2 * | 11/2004 | Jeskey et al. | 211/41.14 |
| 6,910,591 B2 * | 6/2005 | Knoll et al. | 211/41.14 |
| 7,264,126 B1 | 9/2007 | Bergeron | |
| 2002/0178683 A1 * | 12/2002 | Phillips | 52/651.1 |
| 2007/0102598 A1 * | 5/2007 | Nichols | 248/125.8 |

* cited by examiner

*Primary Examiner* — Kimberly Wood
(74) *Attorney, Agent, or Firm* — Mathew R. P. Perrone, Jr.

(57) ABSTRACT

A-frame carriers are used to support slabs and bundles of stone, cases of glass and many more items. A foldable and collapsible A-frame carrier, which is easily assembled for use or disassembled for storage or transport provides more effective support.

11 Claims, 6 Drawing Sheets

FOLDABLE A-FRAME CARRIER

This invention relates to an A-frame carrier and more particularly to a foldable, A-frame carrier, capable of supporting a variety of different materials.

BACKGROUND OF THE INVENTION

A-frame carriers are used to support slabs and bundles of stone, cases of glass and many more items. Such a storage or such a support provides great advantages in handling those materials. Nevertheless, use of A-frame carriers can create many problems.

The overall dimensions of a standard industrial A-frame are sixty inches for a base and sixty inches tall. The size of these A-frames make them awkward to store, especially when they are not in use. Great advantages can be provided if an A-frame carrier can be easily stored when not in use.

Because of the size and the bulk, A-frame carriers can be also very expensive to ship by common carrier. Usually, the size and the bulk are also necessary to provide the necessary strength of the A-frame carrier for its desired purpose. If the utility of the A-frame carrier can be maintained while rendering it easier to store or transport, great advantages can be obtained.

With a foldable or collapsible A-frame carrier, storage and transportation thereof can be improved. However, the features which remit storage and transportation, can weaken the A-frame carrier to a point where it is not suitable for his desired purposes. If the strength and support aspects can be maintained, while providing for easy store agent and transportation, the utility of an A-frame carrier is greatly improved.

SUMMARY OF THE INVENTION

Among the many objectives of the present invention is the provision of a foldable A-frame carrier.

Another objective of the present invention is the provision of a foldable A-frame carrier with maintained strength.

Yet another objective of the present invention is the provision of a foldable A-frame carrier with improved storage capabilities.

Still another objective of the present invention is the provision of a foldable A-frame carrier, which is easily assembled.

Also, an objective of the present invention is the provision of a foldable A-frame carrier, which is easy disassembled.

A further objective of the present invention is the provision of a foldable A-frame carrier with improved transportation capabilities.

These and other objectives of the invention (which other objectives become clear by consideration of the specification, claims and drawings as a whole) are met by providing a foldable and collapsible A-frame carrier, which is easily assembled for use or disassembled for storage or transport.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
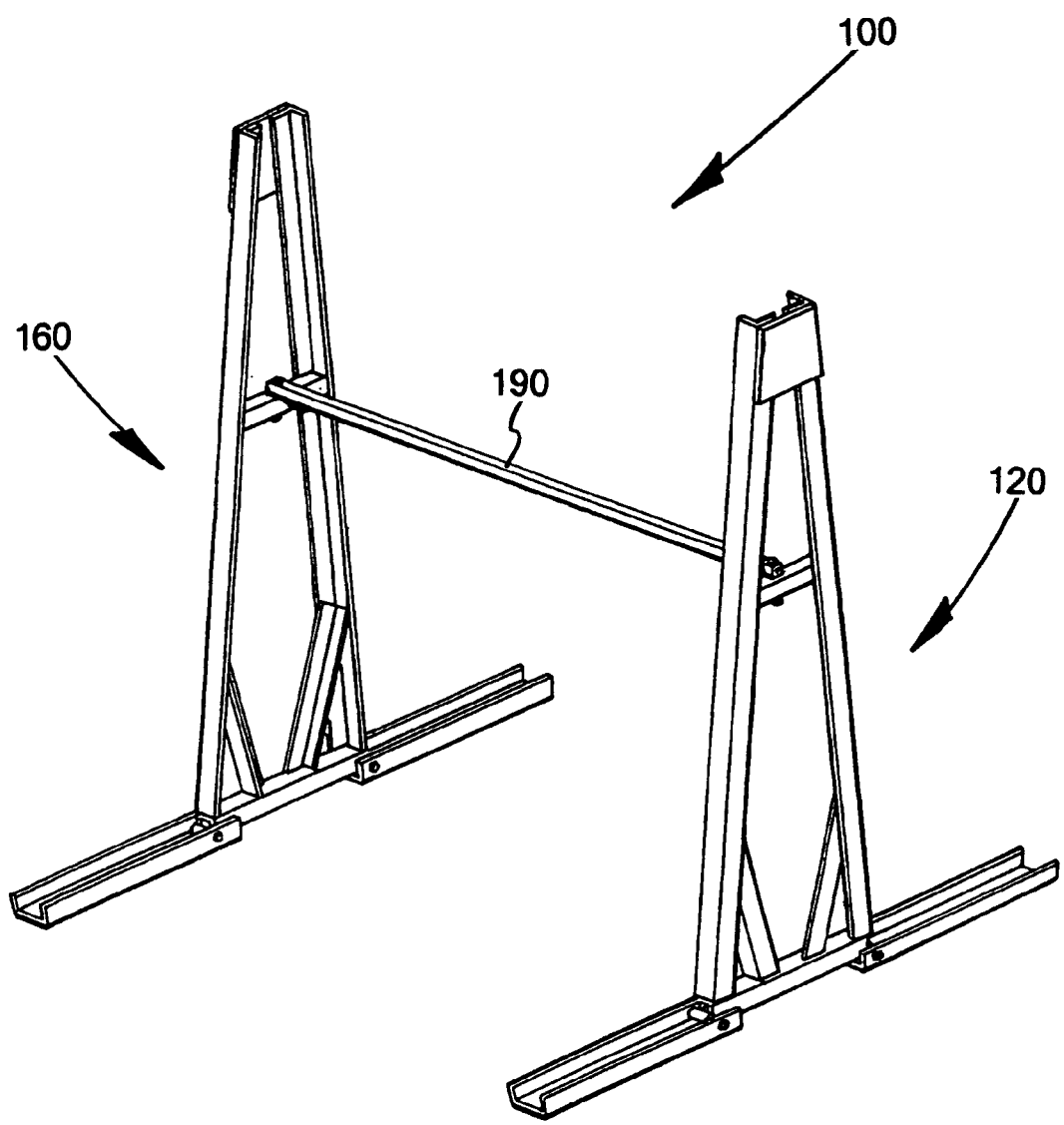
FIG. 1 depicts a perspective view of the foldable A-frame carrier 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar to directional term are not to be construed to limit the scope of the invention in any manner. The words attach, connect, couple, and similar terms with their inflectional morphemes do not necessarily denote direct or intermediate connections, but may also include connections through mediate elements or devices.

The foldable A-frame carrier of this invention includes a first A-shaped side and a second A-shaped side. Preferably, the first A-shaped side and the second A-shaped side are symmetrical. Each includes a pair of arms braced at the top and the bottom. There is a central support between the top brace and the bottom brace. The bottom brace includes a first triangular support connecting it to the first arm and second triangular support connecting it to the second arm.

On the bottom brace adjacent to the first arm is secured a first swingable brace. Likewise on the bottom brace adjacent to the second arm is secured a second swingable brace. Each swingable brace may be placed adjacent to its respective arm or away therefrom. It is preferably secured thereto by a hinge.

A connecting bar joins the first A-shaped side to the second A-shaped side at the central support, especially when use of the foldable A-frame carrier is desired. The connecting bar is easily attached or removed, depending on whether use or storage is desired.

Referring now to FIG. 1, foldable A-frame carrier 100 has a first A-shaped side 120 and a second A-shaped side 160, which work in pairs with cross bar 190. Preferably, the first A-shaped side 120 and the second A-shaped side 160 are substantially symmetrical and substantially mirror images of each other.

First A-shaped side 120 includes a first arm 122 and a second arm 124. First arm 122 and second on 124 are joined by a short top brace 126. A long bottom brace 128 closes the opposing ends of first arm 122 and second arm 124 and oppositely disposed from short top brace 126. Between bottom brace 128 and top brace 126 is positioned a central support 130 also connecting first arm 122 and second arm 124. In this fashion, first A-shaped side 120 is completed.

Second A-shaped side 160 is preferably similar in structure to first A-shaped side 120. includes a first arm 122 and a second arm 124. First arm 122 and second on 124 are joined by a short top brace 126. A long bottom brace 128 closes the opposing end of first arm 122 and second arm 124.

To opposing ends of bottom brace 128 are rotatably secured support arms. First support arm 140 extends from bottom brace 128. Second support arm 142 extends from the opposing end of bottom brace 128. Second support arm 142 maybe extended parallel or coplanar with bottom brace 128, especially for use purposes. Likewise, first support arm 140 may move in a similar fashion.

Figure 2:
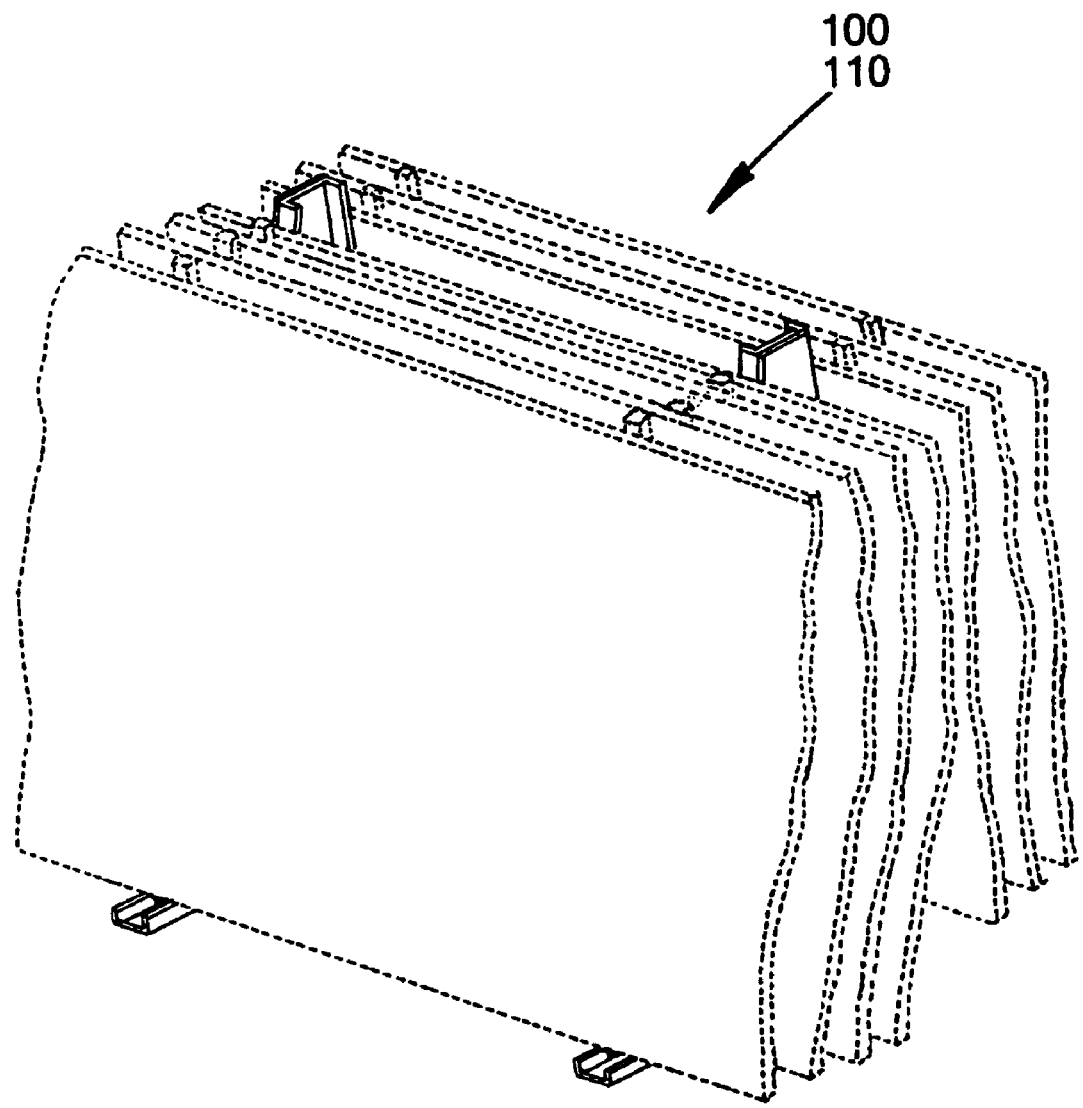
FIG. 2 depicts a perspective view of the foldable A-frame carrier 100 of this invention, supporting a load 110.

Adding FIG. 2 to the consideration, load 110 may be placed on foldable A-frame carrier 100. First arm 122 and second arm 124 combine with first support arm 140 and second support arm 142 to support load 110. Load 110 may be sheets of marble, glass or similar material. Such sheets are usually large and heavy.

If desired both first A-shaped side 120 and second A-shaped side 160 may have a first gusset or triangulating piece 200 connecting bottom brace 128 to first arm 122, and a second gusset or triangulating piece 212 connecting bottom brace 128 to second arm 124. Such a triangulation further supports and strengthens first A-shaped side 120 and second A-shaped side 160.

Figure 3:
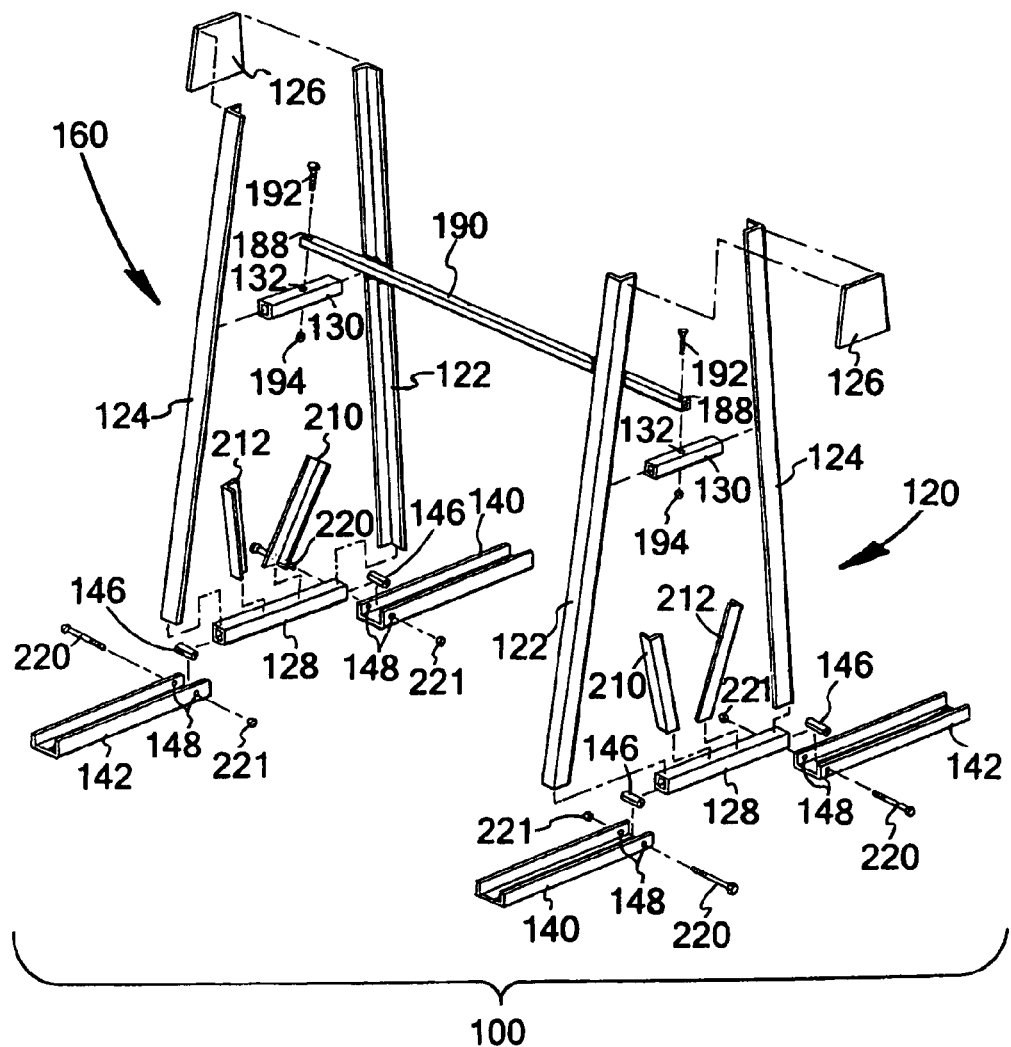
FIG. 3 depicts an exploded, perspective view of the foldable A-frame carrier 100 of this invention.

With the further consideration of FIG. 3, cross bar 190 joins first A-shaped side 120 to second A-shaped side 160, especially for use purposes. In a preferred form, crossbar 190 is attached with bolt 192 and nut 194 to each central support 130. Thus central support 130 includes support aperture 132, while crossbar 190 and end aperture 198 at each end thereof. The structure is such that foldable A-frame carrier 100 is very strong and useful. The facility, with which the foldable A-frame carrier 100 is disassembled or assembled, adds to the value thereof.

First support arm 140 and second support arm 142 have end arm apertures 148 on a common axis to receive a bolt 192. Within the long bottom brace 128 at each end thereof is a bolt tube 146 to receive hinge bolt 220. As bolt 192 passes through an arm aperture 144 through bolt tube 146 and into an arm aperture 144, hinge nut 221 may be applied thereto and provide for rotation of first for support arm 140 and second support arm 142.

Various parts of foldable A-frame carrier 100 may be joined in any suitable fashion. Welding, gluing, bolting or pinning are operable. In most cases, welding is preferred. Crossbar 190 may be clipped, bolted or otherwise secured to central support 130. Preferably crossbar 190 has bar apertures 188 at each thereof to receive bolt 192, which is secured therein by nut 192.

Figure 4:
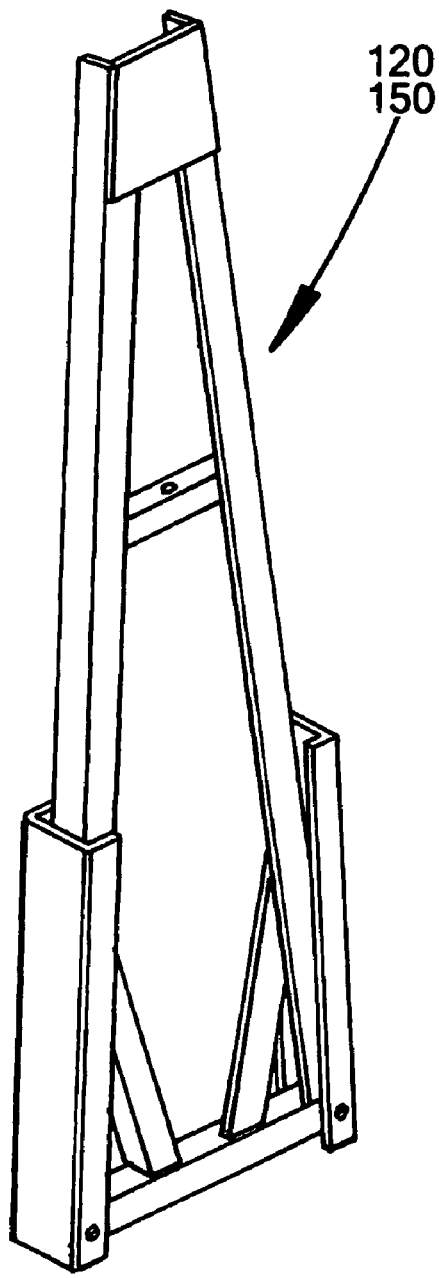
FIG. 4 depicts an assembled, perspective view of a first A-shaped side 120 for the foldable A-frame carrier 100 of this invention in folded position 150.
Figure 5:
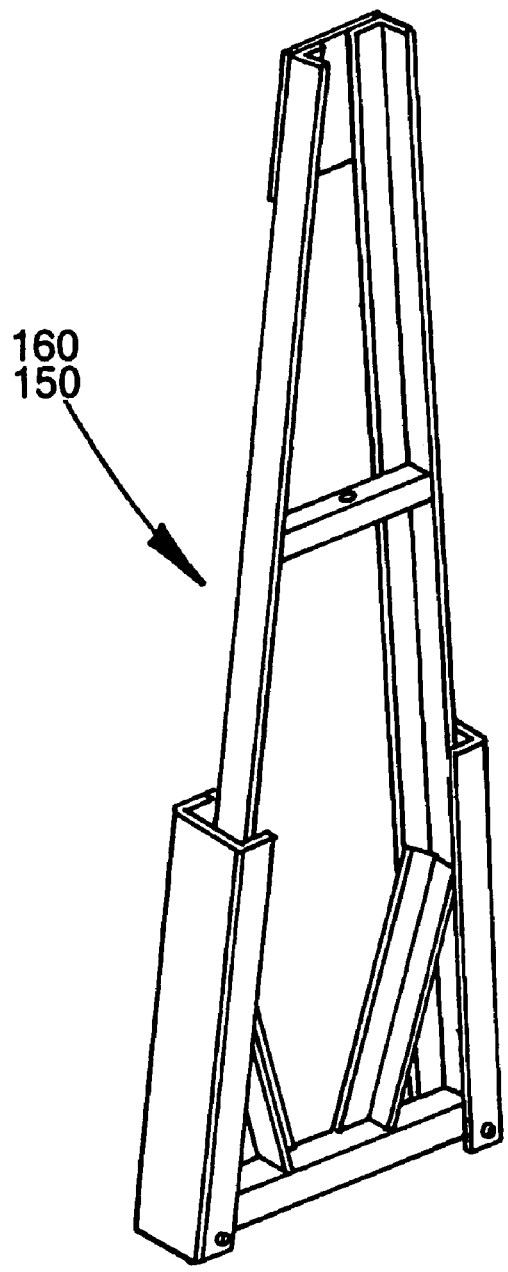
FIG. 5 depicts an assembled, perspective view of a first A-shaped side 120 for the foldable A-frame carrier 100 of this invention in folded position 150, as a reverse view of FIG. 5.

As shown in FIG. 4 and FIG. 5, additionally, first support arm 140 may be folded or rotated at an angle with bottom brace 128 and substantially adjacent to first arm 122, especially for storage purposes or folded position 150. It follows that second support arm 142 may be folded or rotated at an angle with bottom brace 128 and substantially adjacent to second arm 124, especially for storage purposes.

Also clear are the various preferred shapes of the parts of foldable A-frame carrier 100. All pieces are preferably metal. First arm 122, second arm 124, first triangulating piece 210, and second triangulating piece 212 are preferably right angle pieces of metal. Short top brace 126 is preferably a flat trapezoidal piece of metal. Central support 130 and lower brace 128 are preferably hollow rectangles. First support arm 140 and second support arm 142 are preferably usually U-shaped with the flat base.

Figure 6:
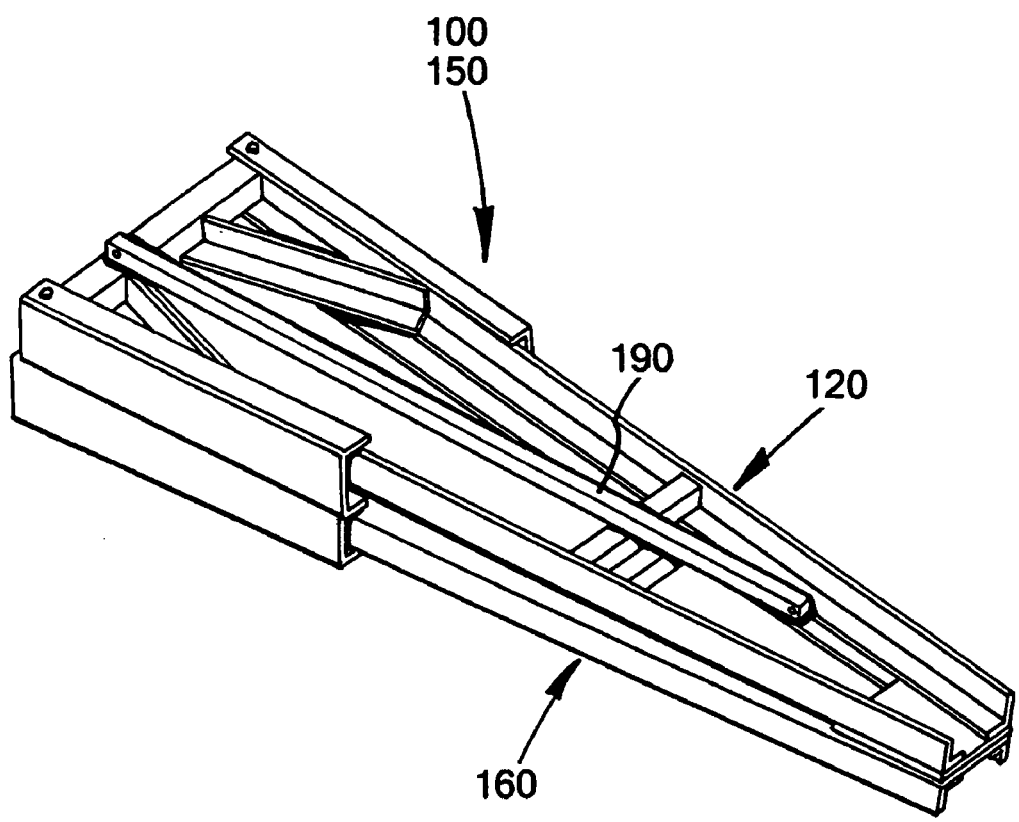
FIG. 6 depicts a disassembled, perspective view of a first A-shaped side 120 and second A-shaped side 160 for the foldable A-frame carrier 100 of this invention in stacked, shipping, folded position 150.

With FIG. 6, the disassembled or storage version of foldable A-frame carrier 100 is depicted. First A-shaped side 120 lies on second side 160 with support arms 140 and 142 being adjacent to arms 122 and 124. Crossbar 190 one is placed on first A-shaped side 120 or second side 160.

Figure 7:
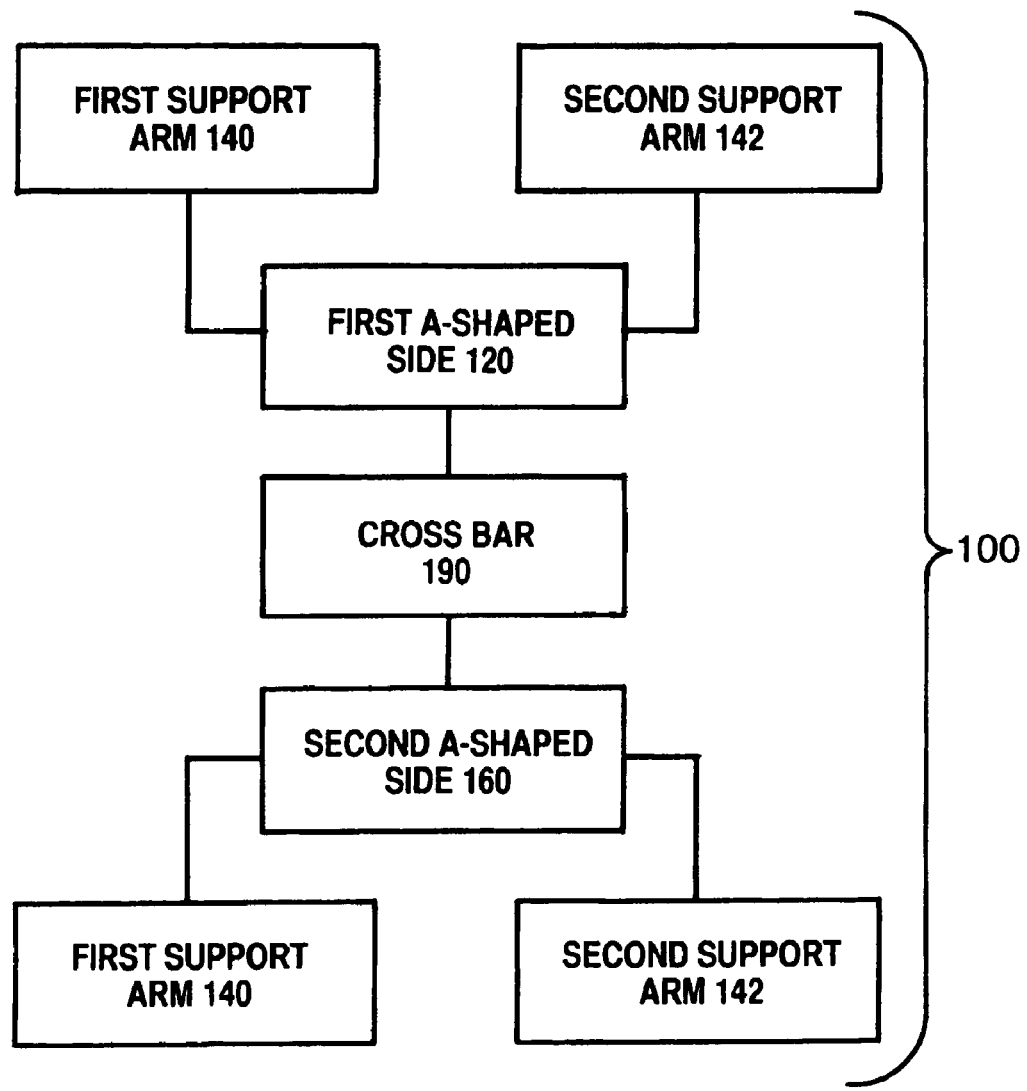
FIG. 7 depicts a box chart for the foldable A-frame carrier 100 of this invention.

With FIG. 7, the flexibility of foldable A-frame carrier 100 is depicted. First A-shaped side 120 is connectible to second A-shaped side 160 with crossbar 190. First A-shaped side 120 and second A-shaped side 160 each have first support arm 140 and second support arm 142 on opposing sides of the base and provide for stability of the foldable A-frame carrier 100 when in use, storage, when not in use.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this device can become clear to a person having ordinary skill in this particular art. Such modifications are clearly covered by this disclosure.

What is claimed and sought to be protected by Letters Patent is:

1. A foldable, A-frame carrier, capable of supporting a variety of different materials comprising:
   the foldable A-frame carrier being collapsible and easily assembled for use or disassembled for storage or transport;
   the foldable A-frame carrier having a first A-shaped side and a second A-shaped side;
   the first A-shaped side and the second A-shaped side cooperating to form the foldable A-frame carrier;
   the first A-shaped side and second A-shaped side including a first arm and a second arm;
   a top brace connecting the first arm and the second arm at a top portion thereof;
   a bottom brace supporting the foldable, A-frame carrier at a bottom portion of the first arm and the second arm;
   a central brace connecting the first arm to the second arm;
   the central brace being positioned between the top brace and the bottom brace;
   a first swingable brace being secured to a bottom portion of the foldable A-frame carrier;
   a second swingable brace being secured to a bottom portion of the foldable A-frame carrier;
   a first triangular support securing the bottom brace to the first arm;
   a second triangular support securing the bottom brace to the second arm;
   the first swingable brace being movably secured to the bottom brace adjacent to the first arm;
   the second swingable brace being movably secured to the bottom brace adjacent to the second arm;
   the first swingable brace being movable relative to the first arm;
   the second swingable brace being movable relative to the second arm;
   the first swingable brace being movable away from the first arm to a first support position;
   the second swingable brace being movable away from the second arm to a second support position;
   the first swingable brace being movable toward the first arm to a first storage position;
   the second swingable brace being movable toward the first arm to a second storage position;

a connecting bar joining the central brace of the first A-shaped side to the second central brace of the second A-shaped side, when use of the foldable A-frame carrier is desired;

the first A-shaped side being similar in appearance to the second A-shaped side;

the connecting bar being easily attached when use of the foldable A-frame carrier is desired;

the connecting bar being easily removed when storage of the foldable A-frame carrier storage is desired;

the first A-shaped side work in a pair with the second A-shaped side when secured by the connecting bar;

the top brace being a short top brace;

the bottom brace being a long bottom brace; and the first swingable brace and the second swingable brace being at least partially rotatable.

2. The foldable, A-frame carrier of claim 1 further comprising the first A-shaped side and the second A-shaped side being substantially symmetrical and substantially mirror images.

3. The foldable, A-frame carrier of claim 2 further comprising:
   a) the first swingable brace and the second support extending from opposing ends of the bottom brace;
   b) the second swingable brace extending substantially parallel or coplanar with the bottom brace for use;
   c) the first swingable brace extending substantially parallel or coplanar with the bottom brace for use; and
   d) the first A-shaped side and the second A-shaped cooperating to support a load.

4. The foldable, A-frame carrier of claim 3 further comprising:
   a) the cross bar being secured to the first A-shaped side and the second A-shaped side with a nut and bolt assembly connecting apertures;
   b) the first swingable brace having a first end arm aperture assembly;
   c) the second swingable brace having a second end arm aperture assembly;
   d) the first end arm aperture assembly receiving a first arm nut and bolt assembly to secure first swingable brace to the long bottom brace;
   e) the second end arm aperture assembly receiving a second arm nut and bolt assembly to secure second swingable brace to the long bottom brace; and
   f) the first swingable brace being oppositely disposed from the second swingable brace.

5. The foldable, A-frame carrier of claim 4 further comprising:
   a) the long bottom brace including a bolt tube each end thereof in order to receive the first arm nut and bolt assembly and the second end arm aperture, as desired; and
   b) the long bottom foldable, A-frame carrier being metal.

6. The foldable, A-frame carrier of claim 5 further comprising:
   a) the first arm, the second arm, the first triangular support and the second triangular support being pieces of metal having aright angle;
   b) the short top brace being trapezoidal;
   c) the central support and the lower brace being hollow rectangles; and
   d) the first swingable brace and the second support arm being U-shaped with a flat base.

7. A method of storing or transporting large sheets of material comprising;

providing a foldable, A-frame carrier, capable of supporting the large sheets of a variety of different materials comprising:

having the foldable A-frame carrier be collapsible and easily assembled for use or disassembled for storage or transport;

providing for the foldable A-frame carrier a first A-shaped side and a second A-shaped side to form the foldable A-frame carrier, with the first A-shaped side and the second A-shaped side having a similar structure;

providing the first A-shaped side with a first arm and a second arm;

providing a top brace to connect the first arm and the second arm at a top portion thereof;

providing a bottom brace to support the foldable, A-frame carrier at a bottom portion of the first arm and the second arm;

g) providing a central brace to connect the first arm to the second arm;

positioning the central brace between the top brace and the bottom brace;

providing a first swingable brace to secure a bottom portion of the foldable A-frame carrier;

a second swingable brace being secured to a bottom portion of the foldable A-frame carrier;

providing a first triangular support to secure the bottom brace to the first arm;

providing a second triangular support to secure the bottom brace to the second arm;

providing a first moving means for the first swingable brace to be movably secured to the bottom brace adjacent to the first arm;

providing a second moving means for the second swingable brace being movably secured to the bottom brace adjacent to the second arm;

the first swingable brace being movable relative to the first arm;

the second swingable brace being movable relative to the second arm;

moving the first swingable brace away from the first arm to a first support position or moving the first swingable brace being toward the first arm to a first storage position; and moving the second swingable brace away from the second arm to a second support position or moving the second swingable brace toward the first arm to a second storage position;

providing the central brace for the first A-shaped side as a first central brace;

providing a second central brace for the second A-shaped side similar to the central brace for the first A-shaped side;

providing a connecting bar to join the first central brace to the second central brace, when use of the foldable A-frame carrier is desired;

forming the first A-shaped side and the second A-shaped side as substantially symmetrical and substantially mirror images;

attaching the connecting bar when use of the foldable A-frame carrier is desired;

removing the connecting bar when storage of the foldable A-frame carrier storage is desired;

the first A-shaped side working in a pair with the second A-shaped side when secured by the connecting bar;

forming the top brace as a short top brace;

forming the bottom brace being a long bottom brace;

the first swingable brace and the second swingable brace being at least partially rotatable;

the first swingable brace and the second support extending from opposing ends of the bottom brace;

the second swingable brace extending substantially parallel or coplanar with the bottom brace for use;

the first support arm extending substantially parallel or coplanar with the bottom brace for use; and the first A-shaped side and the second A-shaped cooperating to support a load.

8. The method of claim 7 further comprising:
a) securing the cross bar to the first A-shaped side and the second A-shaped side with a nut and bolt assembly connecting apertures;
b) providing the first swingable brace having a first end arm aperture assembly;
c) the second swingable brace having a second end arm aperture assembly;
d) the first end arm aperture assembly receiving a first arm nut and bolt assembly to secure first swingable brace to the long bottom brace;
e) the second end arm aperture assembly receiving a second arm nut and bolt assembly to secure second swingable brace to the long bottom brace;
f) the first swingable brace being oppositely disposed from the second swingable brace;
g) providing the long bottom brace with a bolt tube each end thereof in order to receive the first and arm nut and bolt assembly, as desired;
h) forming the long bottom foldable, A-frame carrier of metal;
i) forming the first arm, the second arm, the first triangular support and the second triangular support as pieces of metal having a right angle;
j) the short top brace being trapezoidal;
k) the central support and the lower brace being hollow rectangles; and
l) the first swingable brace and the second swingable brace being U-shaped with a flat base.

9. A foldable, A-frame carrier, capable of supporting a variety of different materials comprising:
the foldable A-frame carrier being collapsible and easily assembled for use or disassembled for storage or transport;
the foldable A-frame carrier having a first A-shaped side and a second A-shaped side;
the first A-shaped side and the second A-shaped side cooperating to form the foldable A-frame carrier;
the first A-shaped side and the second A-shaped side being similar in appearance;
the first A-shaped side including a first arm and a second arm;
a top brace connecting the first arm and the second arm at a top portion thereof;
a bottom brace supporting the foldable, A-frame carrier at a bottom portion of the first arm and the second arm;
a central brace connecting the first arm to the second arm;
the central brace being positioned between the top brace and the bottom brace;
a first swingable brace being secured to a bottom portion of the foldable A-frame carrier;
a second swingable brace being secured to a bottom portion of the foldable A-frame carrier;
the foldable A-frame carrier being formed of metal;
a first triangular support securing the bottom brace to the first arm;

a second triangular support securing the bottom brace to the second arm;

the first swingable brace being movably secured to the bottom brace adjacent to the first arm;

the second swingable brace being movably secured to the bottom brace adjacent to the second arm;

the first swingable brace being movable relative to the first arm;

the second swingable brace being movable relative to the second arm;

the first swingable brace being movable away from the first arm to a first support position;

the second swingable brace being movable away from the second arm to a second support position;

the first swingable brace being movable toward the first arm to a first storage position; and the second swingable brace being movable toward the first arm to a second storage position;

the central brace for the first A-shaped side being a first central brace;

a central brace for the second A-shaped side being a second central brace;

a connecting bar joining the first central brace to the second central brace, when use of the foldable A-frame carrier is desired;

the first A-shaped side and the second A-shaped side being substantially symmetrical and substantially mirror images;

the connecting bar being easily attached when use of the foldable A-frame carrier is desired;

the connecting bar being easily removed when storage of the foldable A-frame carrier storage is desired;

the first A-shaped side working in a pair with the second A-shaped side when secured thereto by the connecting bar;

the top brace being a short top brace;

the bottom brace being a long bottom brace; and the first swingable brace and the second swingable brace being at least partially rotatable.

10. The foldable, A-frame carrier of claim 9 further comprising:
a) the first swingable brace and the second support extending from opposing ends of the bottom brace;
b) the second swingable brace extending substantially parallel or coplanar with the bottom brace for use;
c) the first swingable brace extending substantially parallel or coplanar with the bottom brace for use;
d) the first A-shaped side and the second A-shaped cooperating to support a load;
e) the cross bar being secured to the first A-shaped side and the second A-shaped side with a nut and bolt assembly connecting apertures;
f) the first swingable brace having a first end arm aperture assembly;
g) the second swingable brace having a second end arm aperture assembly;
h) the first end arm aperture assembly receiving a first arm nut and bolt assembly to secure first swingable brace to the long bottom brace;
i) the second end arm aperture assembly receiving a second arm nut and bolt assembly to secure second swingable brace to the long bottom brace; and
j) the first swingable brace being oppositely disposed from the second swingable brace.

11. The foldable, A-frame carrier of claim 10 further comprising:
 a) the long bottom brace including a bolt tube each end thereof in order to receive the first arm nut and bolt assembly and the second end arm aperture, as desired;
 b) the short top brace being trapezoidal;
 c) the central support and the lower brace being hollow rectangles; and
 d) the first swingable brace and the second swingable brace being U-shaped with a flat base.

* * * * *